US012401764B2

(12) United States Patent
Tzoukermann et al.

(10) Patent No.: US 12,401,764 B2
(45) Date of Patent: *Aug. 26, 2025

(54) PROGRAM SEGMENTATION OF LINEAR TRANSMISSION

(71) Applicant: Comcast Cable Communications, LLC, Philadelphia, PA (US)

(72) Inventors: Evelyne Tzoukermann, Silver Spring, MD (US); Hongzhong Zhou, Silver Spring, MD (US); Oliver Jojic, Annandale, VA (US); Bageshree Shevade, Springfield, VA (US); Ryan M. Farrell, College Park, MD (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,857

(22) Filed: Jan. 16, 2024

(65) Prior Publication Data
US 2024/0205373 A1    Jun. 20, 2024

Related U.S. Application Data

(63) Continuation of application No. 16/136,647, filed on Sep. 20, 2018, now Pat. No. 11,917,332, which is a
(Continued)

(51) Int. Cl.
*H04N 7/173* (2011.01)
*H04N 21/233* (2011.01)
(Continued)

(52) U.S. Cl.
CPC ....... *H04N 7/17318* (2013.01); *H04N 21/233* (2013.01); *H04N 21/23418* (2013.01);
(Continued)

(58) Field of Classification Search
USPC ........................................................ 386/250
See application file for complete search history.

(56) References Cited

U.S. PATENT DOCUMENTS 6,002,443 A    12/1999  Iggulden
6,665,732 B1   12/2003  Garofalakis et al.
(Continued)

FOREIGN PATENT DOCUMENTS

DE    102005033795 A1    1/2007
WO       02052440 A1    7/2002

OTHER PUBLICATIONS

A. Dailianas et al., "Comparison of automatic video segmentation algorithms", Proceedings of SPIE, vol. 2615, 1995.
(Continued)

*Primary Examiner* — Nigar Chowdhury
(74) *Attorney, Agent, or Firm* — Banner & Witcoff, Ltd.

(57) ABSTRACT

Content streams may be segmented to provide automatic extraction and storage of content items without intervening commercials or other unrelated content. These content items may then be stored in a database and made accessible to subscribers through, for example, an on-demand service. Automatic segmentation may include the identification of program boundaries, segmentation of a content stream based on the boundaries and the subsequent classification of the segments into content types. For example, audio and video duplication detection may be used to identify commercials since commercials tend to repeat frequently over a relatively short amount of time. A system may further identify an end of program indicator in a video stream to determine when a program ends. Accordingly, if a program ends after a scheduled end time, a recording device (e.g., the program is being recorded) may automatically extend the recording time to capture the entire program.

24 Claims, 12 Drawing Sheets

Related U.S. Application Data continuation of application No. 12/713,883, filed on Feb. 26, 2010, now Pat. No. 10,116,902.

(51) Int. Cl.

| | |
|---|---|
| *H04N 21/234* | (2011.01) |
| *H04N 21/433* | (2011.01) |
| *H04N 21/439* | (2011.01) |
| *H04N 21/44* | (2011.01) |
| *H04N 21/472* | (2011.01) |
| *H04N 21/81* | (2011.01) |
| *H04N 21/84* | (2011.01) |
| *H04N 21/845* | (2011.01) |
| *H04N 21/218* | (2011.01) |

(52) U.S. Cl.
CPC ... *H04N 21/23424* (2013.01); *H04N 21/4334* (2013.01); *H04N 21/4394* (2013.01); *H04N 21/44008* (2013.01); *H04N 21/44016* (2013.01); *H04N 21/47202* (2013.01); *H04N 21/812* (2013.01); *H04N 21/84* (2013.01); *H04N 21/8456* (2013.01); *H04N 21/21815* (2013.01)

(56) References Cited

U.S. PATENT DOCUMENTS

| | | |
|---|---|---|
| 6,735,487 B1 | 5/2004 | Marshall et al. |
| 6,801,895 B1 | 10/2004 | Huang et al. |
| 6,819,863 B2 | 11/2004 | Dagtas et al. |
| 7,337,455 B2 | 2/2008 | Agnihotri et al. |
| 7,386,542 B2 | 6/2008 | Maybury et al. |
| 7,398,000 B2 | 7/2008 | Green |
| 7,565,016 B2 | 7/2009 | Hua et al. |
| 7,765,574 B1 | 7/2010 | Maybury et al. |
| 8,131,552 B1 | 3/2012 | Gibbon et al. |
| 8,200,063 B2 | 6/2012 | Chen et al. |
| 8,380,049 B2 | 2/2013 | Lang et al. |
| 8,457,475 B2 | 6/2013 | Ellis et al. |
| 8,560,319 B1 | 10/2013 | Huang et al. |
| 8,560,391 B1 | 10/2013 | Shaw et al. |
| 2002/0080286 A1 | 6/2002 | Dagtas et al. |
| 2003/0117530 A1 | 6/2003 | McGee et al. |
| 2003/0160097 A1 | 8/2003 | Steiner |
| 2004/0098744 A1 | 5/2004 | Gutta |
| 2004/0125961 A1 | 7/2004 | Alessio et al. |
| 2004/0170392 A1 | 9/2004 | Lu et al. |
| 2005/0044561 A1 | 2/2005 | McDonald |
| 2005/0066352 A1 | 3/2005 | Herley |
| 2005/0102700 A1 | 5/2005 | Cormack et al. |
| 2006/0026524 A1 | 2/2006 | Ma et al. |
| 2007/0192164 A1 | 8/2007 | Nong et al. |
| 2007/0192794 A1 | 8/2007 | Curtis et al. |
| 2007/0223871 A1 | 9/2007 | Thelen |
| 2007/0250901 A1 | 10/2007 | McIntire et al. |
| 2008/0012872 A1* | 1/2008 | Flickinger, Jr. .... H04N 21/4347 345/581 |
| 2008/0059991 A1 | 3/2008 | Romano |
| 2008/0066107 A1* | 3/2008 | Moonka ................. G11B 27/28 725/35 |
| 2008/0120646 A1* | 5/2008 | Stern .................. H04N 21/8133 725/34 |
| 2008/0167106 A1 | 7/2008 | Lutnick et al. |
| 2008/0215984 A1 | 9/2008 | Manico et al. |
| 2008/0275890 A1 | 11/2008 | Chakrabarti et al. |
| 2008/0275901 A1 | 11/2008 | Chakrabarti et al. |
| 2008/0305815 A1 | 12/2008 | McDonough |
| 2009/0003796 A1 | 1/2009 | Borghesani et al. |
| 2009/0015460 A1 | 1/2009 | Fox et al. |
| 2009/0034937 A1 | 2/2009 | Kusunoki et al. |
| 2009/0123090 A1 | 5/2009 | Li et al. |
| 2009/0172730 A1 | 7/2009 | Schiff et al. |
| 2009/0254553 A1 | 10/2009 | Weiskopf et al. |
| 2009/0254933 A1 | 10/2009 | Gupta et al. |
| 2009/0320059 A1 | 12/2009 | Bolyukh |
| 2009/0327168 A1 | 12/2009 | Weinberger et al. |
| 2010/0003007 A1 | 1/2010 | Itakura |
| 2010/0011398 A1 | 1/2010 | Van Steenbergen |
| 2010/0039558 A1 | 2/2010 | Detore |
| 2010/0293218 A1 | 11/2010 | Zhang et al. |
| 2011/0208722 A1 | 8/2011 | Hannuksela |
| 2016/0353715 A1* | 12/2016 | Temby ................. G06V 20/53 |
| 2017/0004383 A1* | 1/2017 | Lin ........................ G06F 18/22 |
| 2019/0369030 A1* | 12/2019 | Wu ........................ G06T 7/337 |
| 2019/0384283 A1* | 12/2019 | Chowdhary ......... G05D 1/0038 |

OTHER PUBLICATIONS

Summons to Attend Oral Proceedings—EP 11155974.6—Mailing date: Apr. 3, 2013.

Yao Wang et al: "Multimedia Content Analysis—Using Both Audio and Visual Clues", IEEE Signal Processing Magazine, IEEE Service Center, Piscataway, NJ, US, vol. 17, No. 6, Nov. 1, 2000 (Nov. 1, 2000), pp. 12-36.

Cernekova, Nikou, Pitas; "Entropy Metrics Used for Video Summarization", Department of Informatics Aristotle, University of Thessaloniki, Proceedings of the 18th Spring Conference on Computer Graphics, Apr. 1, 2002.

European Search Report—EP Appl. 14163781.9—Dated Jan. 14, 2015.

Ebrahimi T et al. "MPEG-7 Camera", Proceedings 2001 International Conference on Image Processing. Institute of Electrical and Electronics Engineers. Oct. 7, 2001.

European Extended Search Report—EP 14163781.9—Dated May 18, 2015.

Response to European Office Action—EP Appl. 14163781.9—submitted Dec. 16, 2015.

European Office Action—EP Appl. 14163781.9—dated Mar. 29, 2016.

European Office Action—EP Appl. 14163781.9—dated Nov. 14, 2016.

Canadian Office Action—CA Application No. 2731706—dated Mar. 2, 2017.

Apr. 25, 2018—Canadian Office Action—CA 2,731,706.

Masami Mizutani, Shahram Ebadollahi and Shih-Fu Chang, "Commercial Detection in Heterogeneous Video Streams Using Fused Multi-Modal and Temporal Features", Columbia University ADVENT Technical Report No. 204-2004-4, 21 pages.

Alexander G. Hauptmann, Michael J. Witbrock, "Story Segmentation and Detection of Commercials In Broadcast News Video", ADL-98 Advances in Digital Libraries Conference, Santa Barbara, CA, Apr. 22-24, 1998, 12 pages.

Cerneková et al., "Shot Detection in Video Sequences Using Entropy-Based Metrics", International Conference on Image Processing, Sep. 22, 2002.

N. Dimitrova et al., "Real time commercial detection using MPEG features", 6 pages.

Extended European Search Report dated Sep. 30, 2011, corresponding EP Application No. 11155974.6; English Translation.

V. V. Vasudevan et al, "Union Color Histogram Descriptor for Multiple Frame/Picture Color Characterization", ITU Study Group 16—Video Coding Experts Group—ISO/IEC MPEG & ITU-T VCEG) ISO/IEC JTC1/SC29/WG11 and ITU-T SG16 Q6) Mar. 7, 2000.

Heidi Christensen et al., "Maximum Entropy Segmentation of Broadcast News", 4 pages.

Marios Kyperountas et al, "Enhanced Eigen-Audioframes for Audiovisual Scene Change Detection", IEEE Transactions on Multimedia, IEEE Service Center, Piscataway, NJ, Jun. 1, 2007.

Partial European search report for application No. 11155974.6 mailed Jun. 10, 2011.

Piro et al., "Image Retrieval via Kullback-Leibler Divergence of Patches of Multiscale Coefficients in the KNN Framework", International Workshop on Content-based Multimedia Indexing, 2008, Piscataway, NJ, Jun. 18, 2008.

(56) References Cited

OTHER PUBLICATIONS

Tzoukermann et al., "Semantic Multimedia Extraction using Audio and Video", Mar. 17, 2009, 18 pages.
Xian-Sheng Hua, Lie Lu, and Hong-Jiang Zhang, "Robust Learning-Based TV Commercial Detection", Microsoft Research Asia, 2005, 4 pages.
Oct. 30, 2020—Canadian Office Action—CA 2,731,706.
Sep. 8, 2021—Canadian Office Action—CA 2,731,706.

* cited by examiner

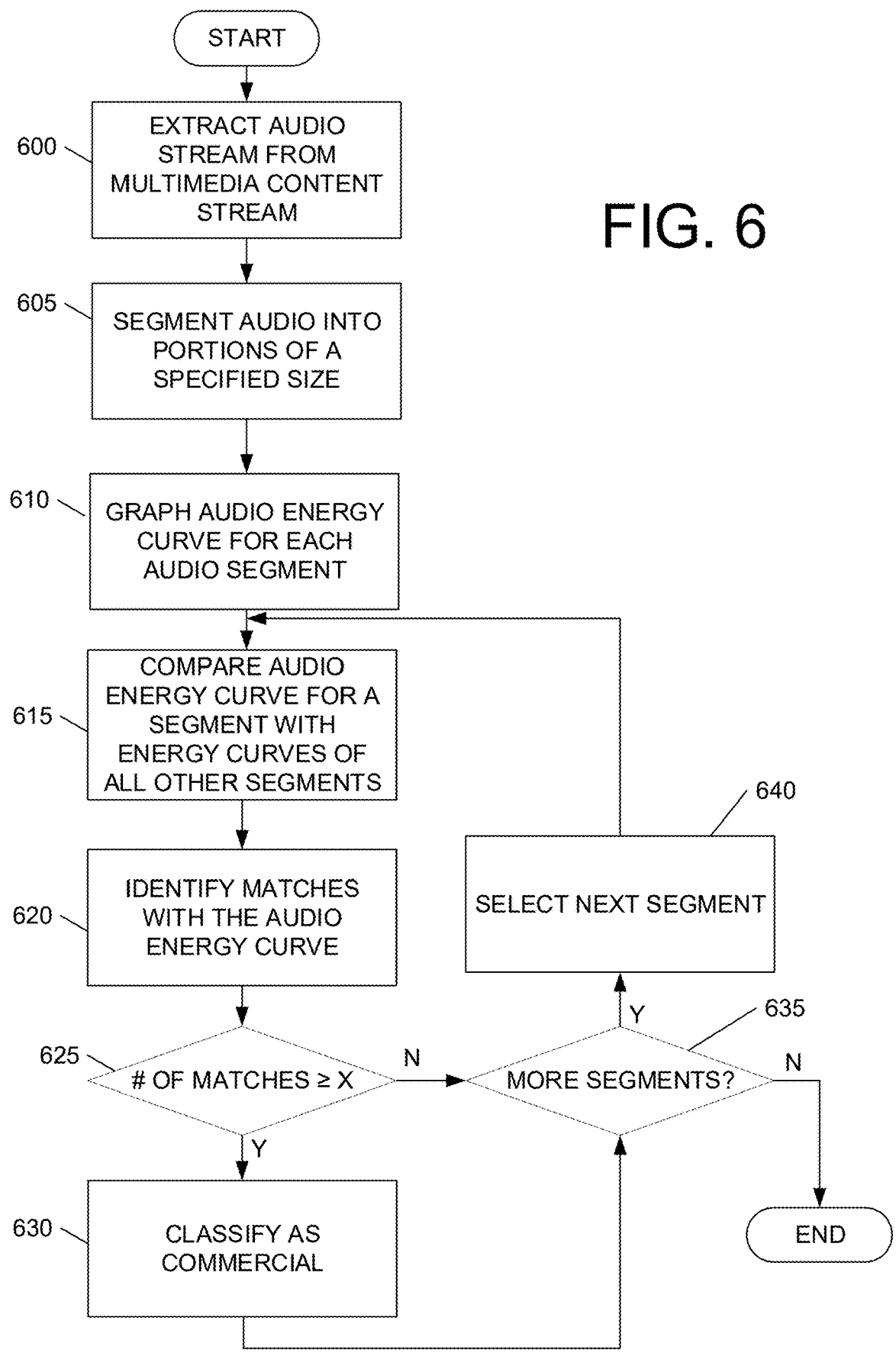

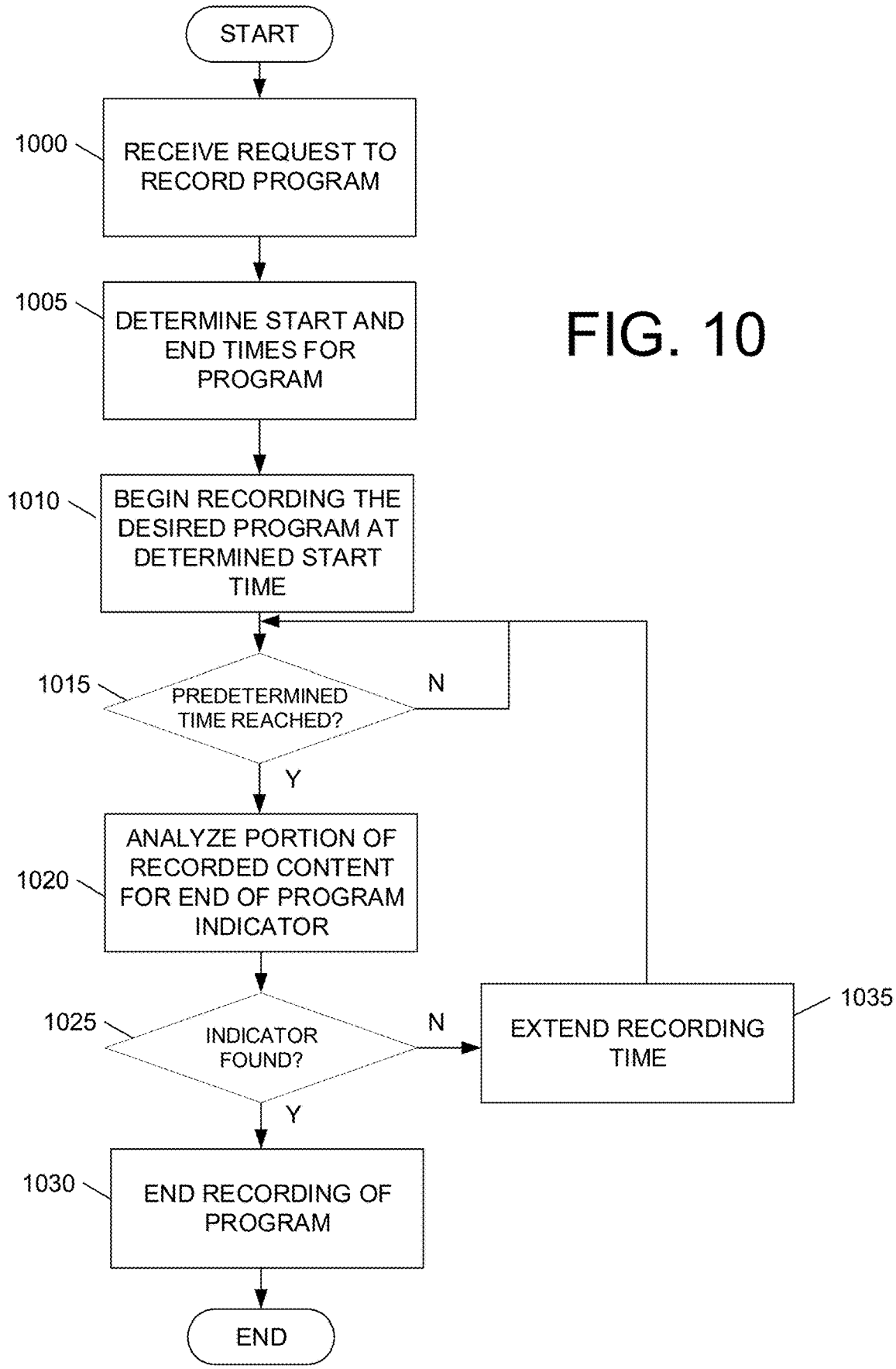

PROGRAM SEGMENTATION OF LINEAR TRANSMISSION

CROSS-REFERENCE TO RELATED APPLICATIONS

This application is a continuation of U.S. application Ser. No. 16/136,647, filed on Sep. 20, 2018, which is a continuation of U.S. application Ser. No. 12/713,883 (now U.S. Pat. No. 10,116,902), filed Feb. 26, 2010. Each of the aforementioned applications is hereby incorporated by reference in its entirety.

TECHNICAL FIELD

Aspects of the disclosure relate to processing linear content streams. In particular, one or more aspects relate to the identification of segments in a linear transmission and the utilization of such information.

BACKGROUND

The increased popularity of video recording devices and video-on-demand has motivated television programming providers to expand the capabilities and functionality of recording devices while increasing video-on-demand offerings. One of the attractions of video recording devices and video-on-demand is the ability for a subscriber to move past commercials, thereby viewing desired content in one continuous segment, rather than in a series of segments separated by advertisements. However, video recording devices are often configured to record a specific time frame. Accordingly, if a program runs long, the device might not record the entire program. Alternatively, if a program is shorter than the allotted time frame, the device may waste recording space with other programming.

Video-on-demand provides programming that is generally commercial free. However, video-on-demand typically requires a service provider to purchase a program without commercials or to create a commercial free version of the program by segmenting a video feed. With the vast number of considerations in segmenting video streams, such a process is often performed using manual judgment and determinations. For example, a service provider employee may view a video stream and manually identify commercial start times and end times within a video stream. Additionally or alternatively, the service provider employee may identify the beginning and end of different programs.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

According to one or more aspects, a linear content stream may be automatically segmented into its constituent parts for use in video-on-demand, commercial-free recording and other purposes. A video stream may be analyzed to identify cuts, fades, black frames and other programming boundaries using various image analysis measurements such as entropy and mutual information. Once these boundaries have been identified, the video stream may be divided into multiple segments along the identified boundaries. The segments may then be classified into corresponding content types such as commercials, television shows, sporting events, movies and the like. Segments of the same content type may be merged together sequentially to form a single video content item. In one or more arrangements, commercials might not be merged in similar fashion since each commercial segment is generally distinct from each other whereas television show and movie segments generally comprise a sequence of events. The segments may be classified according to a variety of classification algorithms. The classification algorithm(s) used may be selected based on the content type in the video stream.

According to another aspect, duplicate audio and/or video detection may be used to identify commercial segments using the assumption that commercials are often played multiple times over a relatively short period of time. Audio duplicate detection, for example, may include segmenting an audio stream into portions of a predefined size (e.g., 5 seconds). The audio energy curve for each segment is then generated and compared with the other energy curves. A duplicate may be identified where two audio energy curves overlap. In one or more arrangements, audio segments may be determined to correspond to a commercial if duplicates are found for a group of consecutive or adjacent audio segments rather than for a single audio segment in isolation.

According to yet another aspect, the end of a program may be identified and used to automatically extend the recording time of the program if necessary. For example, if a program is originally scheduled to air between 8:30 PM and 9:00 PM, a recording device may schedule recording between those times. However, if the program runs long (e.g., a baseball game going into extra innings), the recording device may automatically extend the recording time by a predefined amount of time or until an end of program is detected. The end of a program may be identified based on an indicator. In one example, the indicator may comprise a dynamic logo such as an animation for a broadcast station or a production company. Upon detecting the dynamic logo, the recording device may end the recording.

The details of these and other embodiments of the present disclosure are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIG. 6 is a flowchart illustrating a method for detecting audio duplicates in an audio stream according to one or more aspects described herein.

FIG. 10 is a flowchart illustrating a method for automatically extending recording times for recording a program according to one or more aspects described herein.

DETAILED DESCRIPTION

Figure 1:
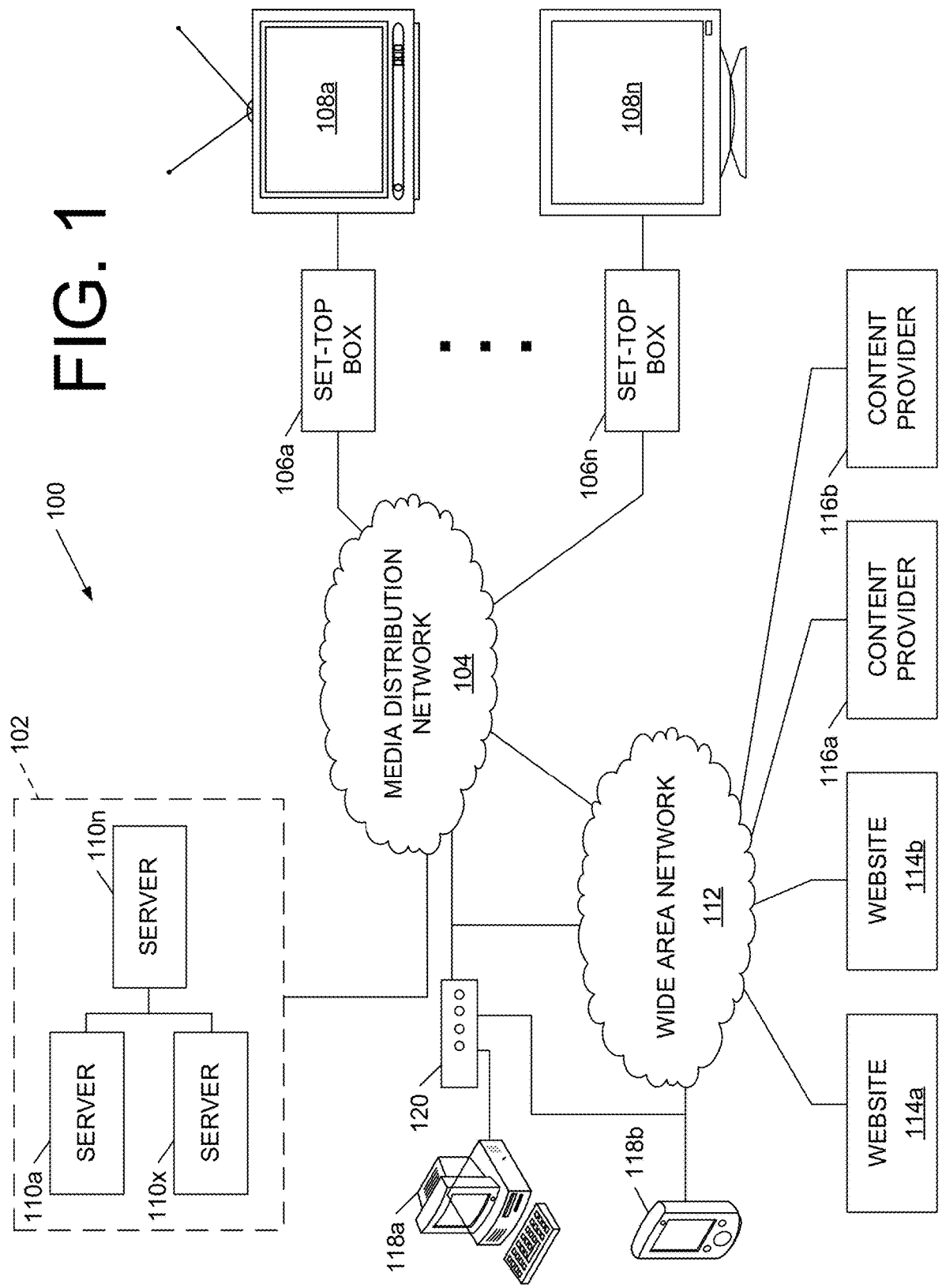
FIG. 1 illustrates an example network environment in which content items may be distributed to subscribing clients.

FIG. 1 illustrates a content distribution system 100 that may be used in connection with one or more aspects described herein. The distribution system 100 may include a headend 102, a media distribution network 104, set top boxes (STBs) 106a-106n and corresponding receiving devices (i.e., receiver, transceiver, etc.) 108a-108n. STBs 106a-106n may include a general computing device that is configured to receive television programming over one or more channels. Alternatively, the media distribution network 104 may be connected directly to devices 108a-108n. The distribution system 100 may be used as a media service provider/subscriber system wherein the provider (or vendor) generally operates the headend 102 and the media distribution network 104 and also provides a subscriber (i.e., client, customer, service purchaser, user, etc.) with the STBs 106a-106n. Network 104 may comprise a network such as a hybrid fiber optic coax network, a fiber optic network, a wireless network, a network that combines one or more of the foregoing networks, or another type of network that is dedicated to the distribution of content by the service provider and other services provided by the service provider. Accordingly, network 104 is generally not publicly accessible, rather network 104 might only be accessible by users or subscribers of the service provider.

The STB 106a is generally placed at a subscriber location such as a subscriber's home, a tavern, a hotel room, a business, etc., and the receiving device 108a is generally provided by the subscribing client. As noted above, although the disclosure may refer to STBs 106a-106n, aspects described herein may be implemented without STBs, for example, with devices 108a-108n being connected to network 104 and performing necessary functions. Receiving device 108a may include a television, high definition television (HDTV), monitor, host viewing device, MP3 player, audio receiver, radio, communication device, personal computer, media player, digital video recorder, game playing device, etc. The device 108a may be implemented as a transceiver having interactive capability in connection with the STB 106a, the headend 102 or both the STB 106a and the headend 102. The headend 102 may include a plurality of devices 110 (e.g., devices 110a-110n) such as data servers, computers, processors, security encryption and decryption apparatuses or systems, and the like.

In one or more embodiments, network 104 may further provide devices 106a-106n and 118a-118b with data access to a publicly accessible wide area network (WAN) 112 such as the Internet. In one example, a service provider may allow a subscriber to access websites 114a and 114b and content providers 116a and 116b connected to the Internet (i.e., WAN 112) using their corresponding STB 106a. In another example, a service provider (e.g., a media provider) may supplement or customize media data sent to a subscriber's STB 106a using data from the WAN 112. To access the WAN 112 using computing devices 118a-118b (rather than a STB 106a), a user may be provided with a user device such as a cable modem 120 that is configured to process data carried through radio frequency (RF) channels on the cable television infrastructure (e.g., network 104) into IP data packets.

Figure 2:
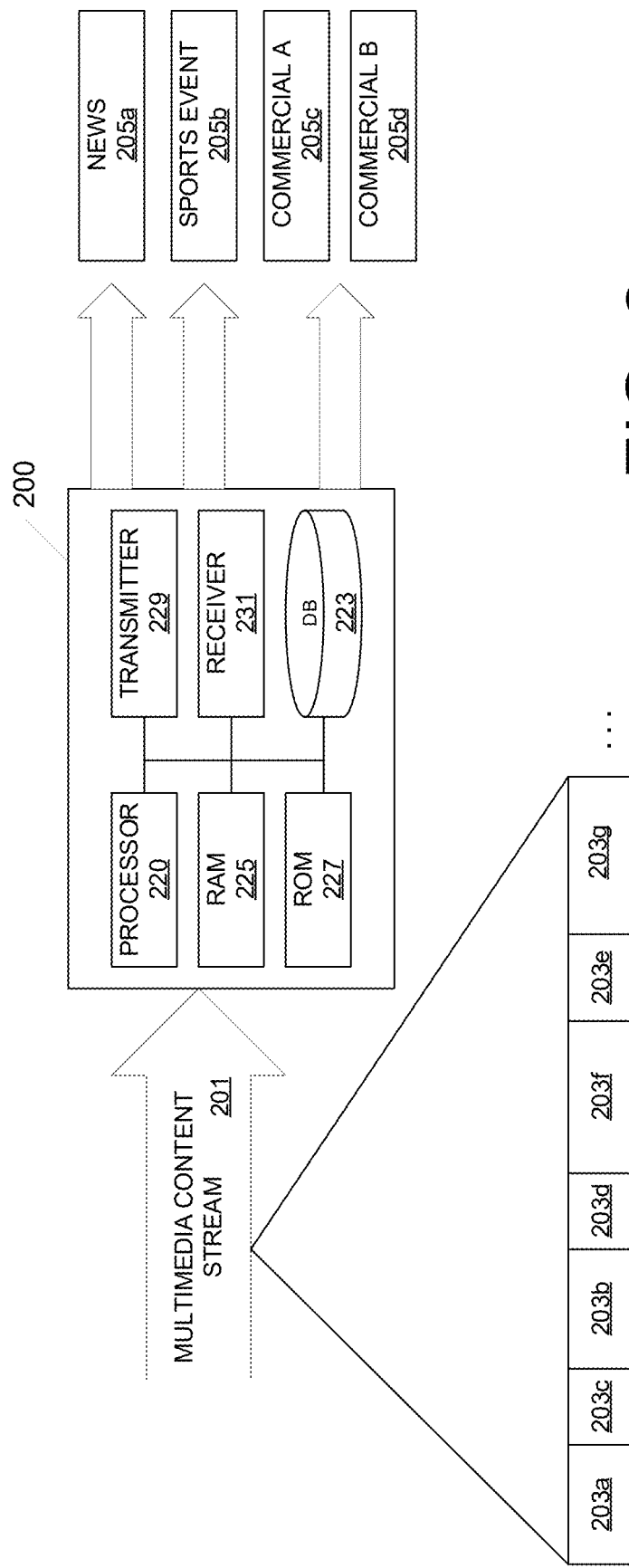
FIG. 2 illustrates an example segmentation process executed by a video processing system according to one or more aspects described herein.

FIG. 2 illustrates a live video stream that may be received from a content provider (e.g., a television broadcast company, a movie studio, etc.) at a service provider server 200. Linear multimedia content stream 201 may include a plurality of programming segments 203a-203g. Each segment may correspond to a particular program or content item including movies, commercials, television shows such as sporting events and news reports, public service announcements and the like. In exemplary multimedia content stream 201, segments 203a and 203b correspond to news 205a, segments 203c, 203d and 203e comprise commercial programming and segments 203f and 203g correspond to a sporting event 205b. Segments 203c, 203d and 203e may correspond to the same commercial 205c repeated over time or may comprise multiple different commercials (e.g., 205c and 205d).

In one or more arrangements, server 200 is configured to automatically segment multimedia content stream 201 into news report 205a, sporting event 205b and commercials 205c and 205d, for example, by automatically identifying the start and end points of the particular content. Segmentation may include processing audio information and analyzing image information including hue, saturation, or color values as described in further detail herein. By segmenting the various content items 205a-205d, server 200 may automatically combine segments 203 to form content items 205a-205d. Content items 205a-205d may further be stored as individual assets within a database, such as video-on-demand database 223, and offered to subscribers. Alternatively or additionally, server 200 may be configured to notify a user device which may be a user-owned device or a device provided by the service provider of the start and end times of particular content items 205a-205d. In particular, server 200 may notify a user device of the start and end times of commercials 205c and 205d so that a viewer may skip over commercials 205c and 205d without having to manually identify when the commercials start and end. For example, upon reaching commercial 205d in stream 201, a viewer may select a skip function on a user device. In response, the user device may then skip automatically to the determined end time of commercial 205d. Still further, server 200 may transmit determined start and end times of television programming such as sporting event 205b or news report 205a to a user device to provide more precise programming information. For example, if sporting event 205b is originally scheduled to broadcast between 12:00 PM and 3:00 PM, but instead runs longer, e.g., until 3:12 PM, server 200 may notify the user device of the overrun. For example, overruns may be detected by determining whether an end of program indicator such as a production company animation has been detected as described in further detail below. Similarly, if television show 205a is scheduled between 7:30 PM and 8:00 PM, but only runs until 7:58 PM with 2 minutes of commercial between 7:58 PM and 8:00 PM, server 200 may be configured to recognize and notify a user device that the television show ends at 7:58 PM instead of 8:00 PM. The precision of the determination of the server 200 may correspond to minutes, second, milliseconds or the like.

Server 200 may include various computing components including processor 220, database 223, RAM 225, ROM 227, transmitter 229 and receiver 231 to provide automatic program segmentation functionality. For example, processor 220 may be used to perform mathematical functions and execute instructions stored in RAM 225 or ROM 227. Processor 220 may include a single processor, multiple processing cores or multiple processors. For example, processor 220 may include a central processing unit (CPU) in addition to a graphics processing unit (GPU). The separate graphics processing unit may be used to aid image analysis operations and the like. In addition to video-on-demand assets, database 223 may store content metadata, subscriber information, network configuration information, content provider information and the like. Transmitter 229 and receiver 231 may be configured to transmit content and receive content, respectively. For example, transmitter 229 may be configured to transmit content data to subscribers in a media distribution network (e.g., network 104 of FIG. 1) and receiver 231 may be configured to receive content from broadcast sources such as television broadcasters.

According to one or more arrangements, the program segmentation processes and functionality may be performed by individual user devices such as STBs 106a-106n of FIG. 1. For example, the user device may be configured to receive a video stream from server 200 and to segment the programs for commercial-free storage. The user device may further identify more precise start and end times of program segments 203a-203g and/or entire content items 205a-205d to automatically adjust recording times, if necessary. In one example, a viewer may schedule the recording of a movie between the hours of 3 PM and 5 PM based on start and end times advertised in a predefined electronic service guide. If, however, due to various circumstances such as an overrun of a previous program, the movie actually broadcasts between 3:10 PM and 5:10 PM, the user device may automatically adjust the recording times appropriately. According to one aspect, the user device may begin recording at 3 PM, but upon determining that the program did not start until 3:10 PM, the recorded portion between 3 PM and 3:10 PM may be deleted. To provide such functionality, the user device may include computing components similar to those described with respect to server 200.

Figure 3:
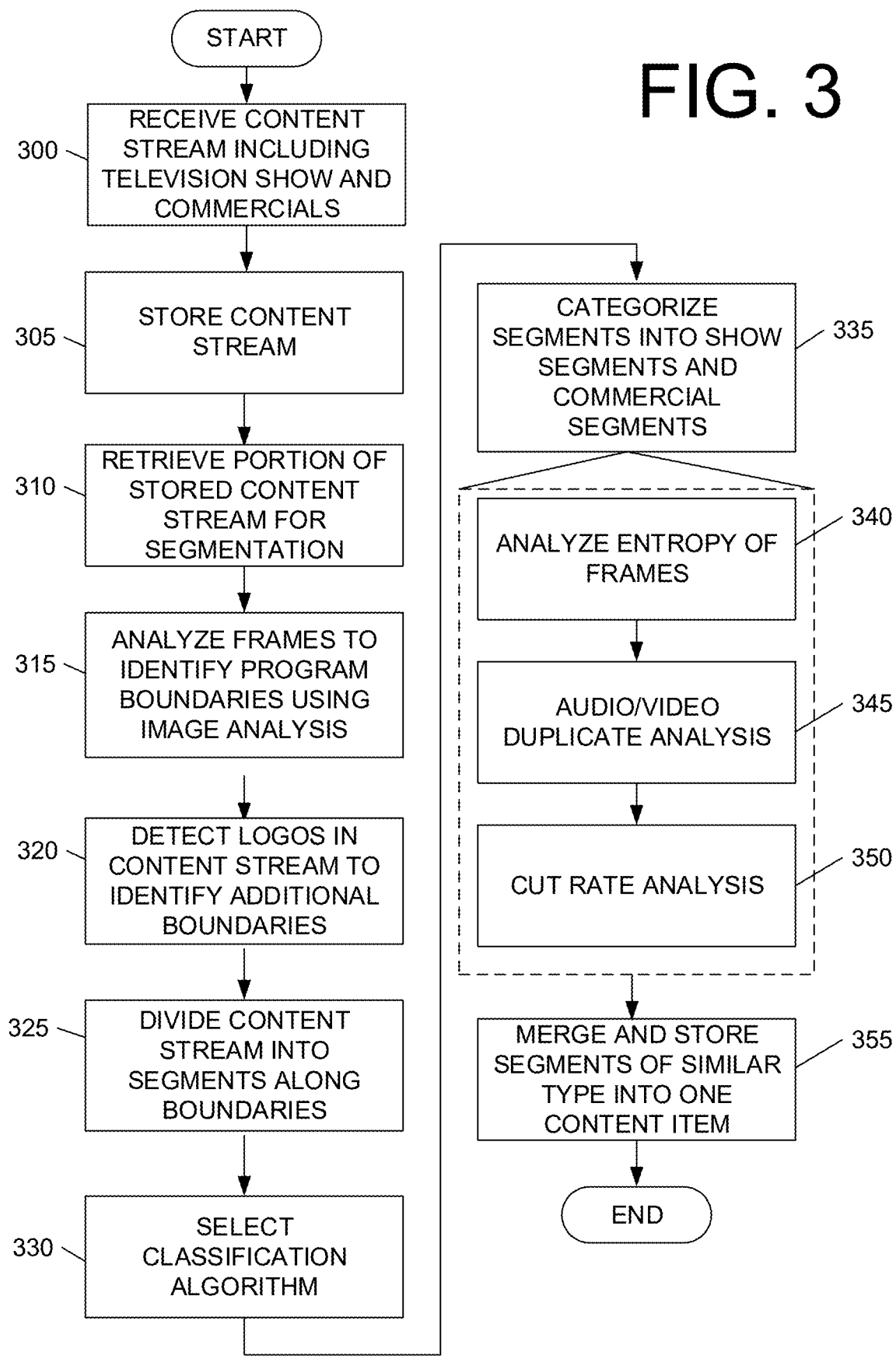
FIG. 3 is a flowchart illustrating a method for automatically segmenting a linear content stream into multiple programs or content items according to one or more aspects described herein.

FIG. 3 illustrates a method for automatically segmenting programs in a video stream for storage as one or more individually accessible and distinct content items. For example, the method may be performed by either a service provider server, such as server 200 in FIG. 2 or a user device such as STB 106a of FIG. 1, to separate out portions of a television show transmission and commercials included therebetween. In step 300, a video processing device may receive a content stream including a television show and commercials between portions of the show from a service or content provider. The content stream may be accompanied by or include electronic service guide information identifying channels, program titles, scheduled program start and end times and other types of content metadata. In step 305, the video processing device may store the content stream. The video processing device may subsequently retrieve a portion of the stored content stream for segmentation analysis in step 310. The size of the analyzed portion may vary depending on the capacity and capabilities of the processing device, user preferences, service provider preferences and/or combinations thereof. In one or more arrangements, the amount of content retrieved may be based on a predefined program schedule. For example, if a show is scheduled for broadcasting between 10:30 AM and 11 AM, the content stream for that portion of time may be retrieved.

In step 315, the video processing device may analyze frames of the content stream to identify program boundaries within the stream using a transition in the content stream. A transition may be identified, for example, using black frame, cut and fade detection algorithms, for example. Black frames are generally inserted between programs to signify the transition from one to the other. Cuts and fades may also be indicative of a transition from one program to another (e.g., from a television show to a commercial). A cut may include an immediate change or switch between a frame of a first content item and a frame of a second content item. A fade, on the other hand, may include a slower transition between the first content item frame and the second content item frame where the frames may be blended together to provide a more gradual transition. Alternatively or additionally, a fade may include blending a black frame or a frame of another color with one or more of the content frames. Image analysis techniques for identifying black frames, cuts and fades may include measuring frame entropy, pairwise joint entropy (e.g., entropy between two frames), pairwise Kullback-Liebler (KL) divergence, Mahalanobis distance and the like. Entropy may include a measure of dissimilarity or disorder of a particular attribute such as hue, saturation, red, green or blue values within a frame or between two frames. Entropy may be used to express the amount of uncertainty that exists for a variable within a system (e.g., one or more frames of video or audio). Accordingly, if a video frame is entirely black, the entropy may be low since there is little to no uncertainty as to the color value in that frame. In contrast, a colorful image having many different colors may have higher entropy as the uncertainty of the color value in such a frame is higher. In one example, entropy for a frame is calculated according to the following formula:

$$H(X) = -\sum_{i=1}^{n} p(x_i) \log_2 p(x_i)$$

where H represents entropy, X represents the variable or parameter for which entropy is to be measured and having a range of possible values $\{x_1, \ldots, x_n\}$, n represents the number of possible values for X, and $p(x_i)$ represents the probability of X being equal to $x_i$. Pairwise joint entropy may be calculated according to the above equation using the collective values and probabilities over two frames, rather than a single frame.

Figure 4:
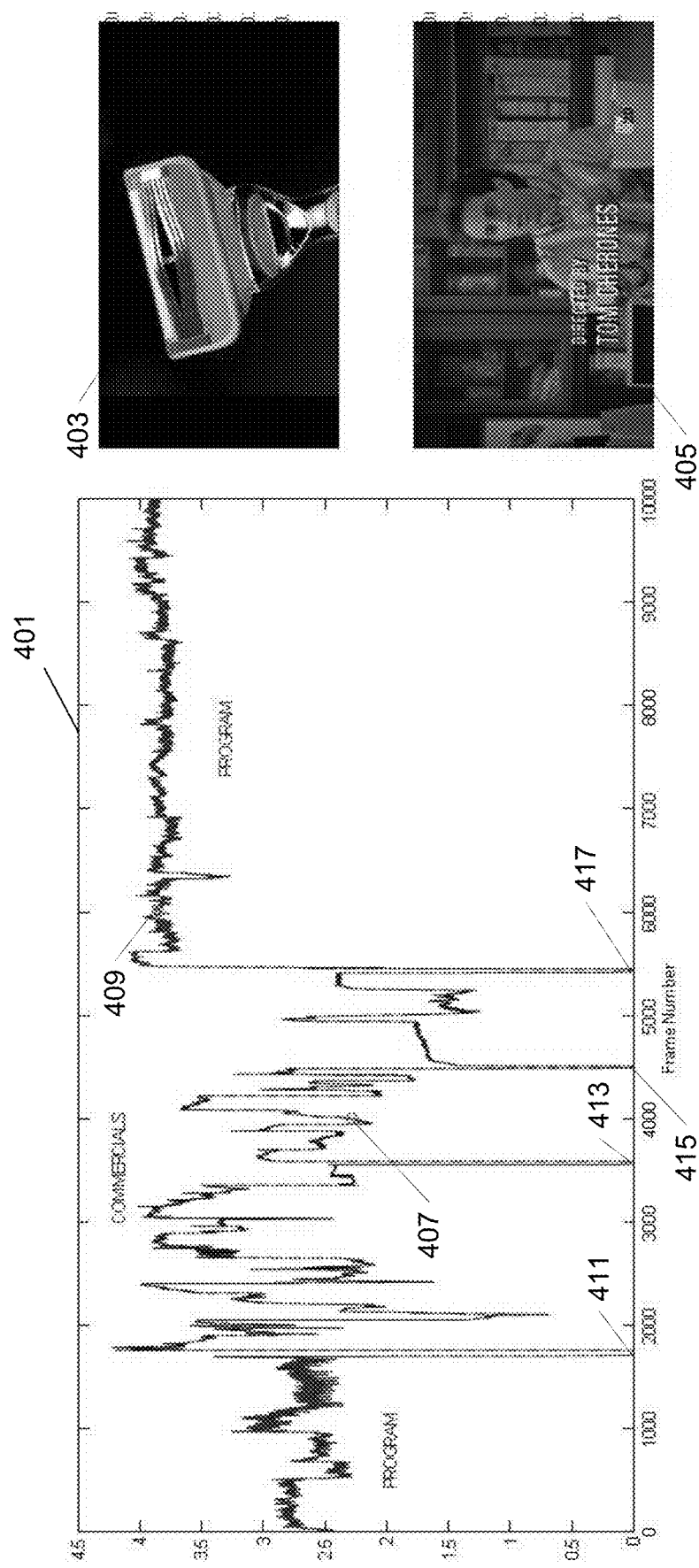
FIG. 4 is a graph illustrating relative entropy levels within a content stream according to one or more aspects described herein.

FIG. 4 illustrates a graph 401 of entropies for a video stream comprising a commercial frame 403 and a television show frame 405. In one or more arrangements, commercial frame 403 and television show frame 405 may include any type of video programming including sporting event programming, movies, dramas, situation comedies, talk shows, commercials, news programming, special event programming, paid advertising, game shows and the like. Because, in this example, commercial frame 403 is predominantly black with small areas of color as compared with television show frame 405, the entropy value 407 of commercial frame 403 is lower than the entropy value 409 of show frame 405. Extremely low values of entropy (e.g., near zero), may be identified as black frames. Thus, frames corresponding to entropy values 411, 413, 415 and 417 may be identified as black frames in the video stream and suggest a program boundary.

Cuts may be detected by determining an amount of mutual information between two consecutive frames. Because cuts generally involve the abrupt switch from one scene to another, the mutual information for frames having a cut between them is typically very low (e.g., near zero). Accordingly, cuts may be identified at points in the video stream where the amount of mutual information is near zero or below a specified threshold. Fades, on the other hand, may be detected using joint entropy, which measures the amount of information carried between frames. A fade-out, for instance, may be detected by identifying a local minimum and determining a point where the joint entropy begins a gradual decrease to the local minimum. A fade-in, on the other hand, may be detected by identifying gradual increases. In one or more arrangements, fades and cuts may be identified according to techniques, algorithms and methodologies as described in Cernekova, Z. et al., "Shot Detection in Video Sequences Using Entropy-based Metrics," Proceedings of the 2002 IEEE International Conference in Image Processing, 2002.

Figure 5A:
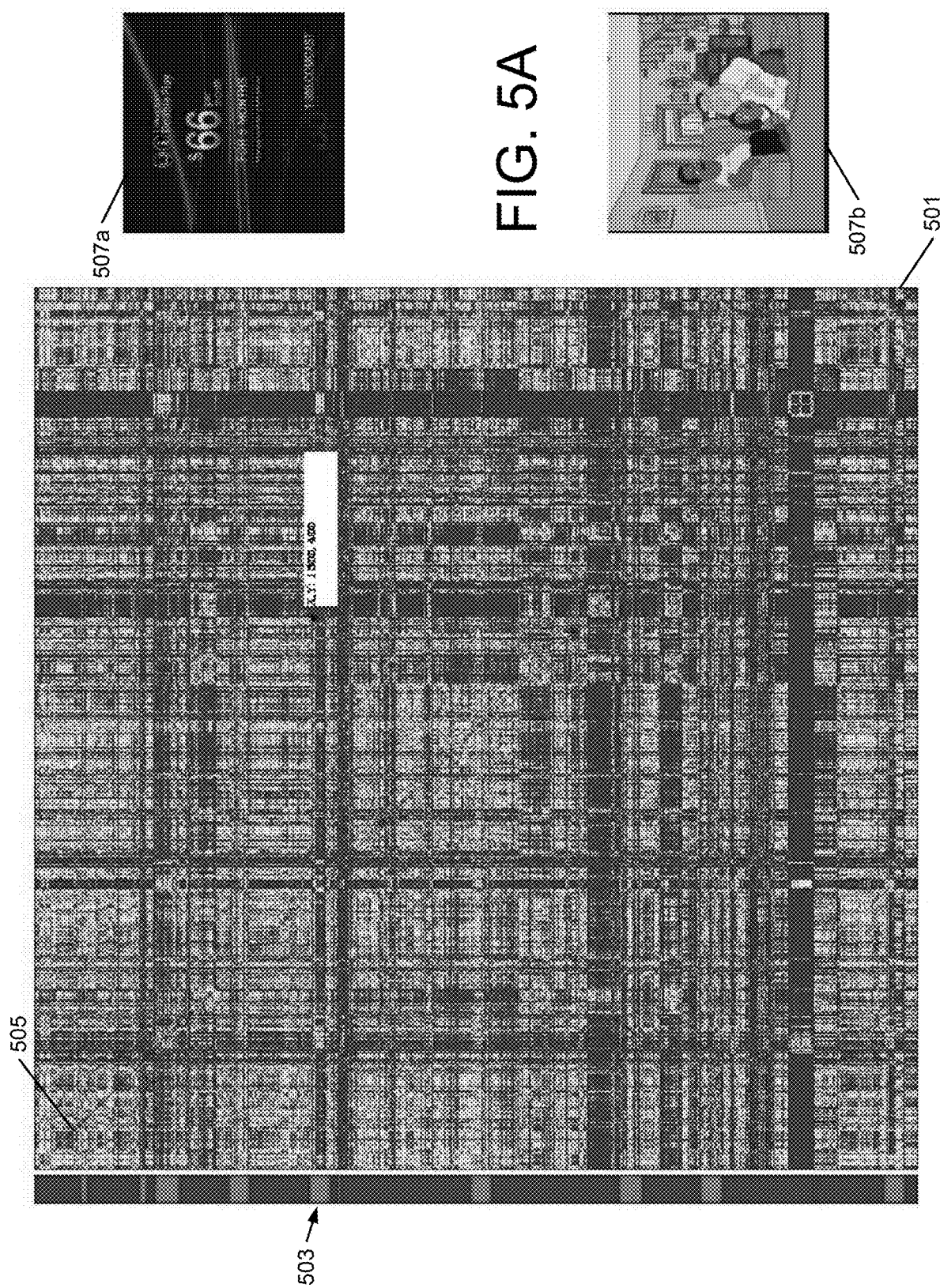
FIG. 5A illustrates a KL divergence matrix for a video segment according to one or more aspects described herein.

FIG. 5A illustrates a KL divergence matrix 501 that illustrates the KL divergence for each pair of video frames in a video segment that may comprise a commercial and a television show. In one or more arrangements, the KL divergence may be color coded to indicate a degree of divergence. For example, red may indicate a higher level of KL divergence while blue may indicate low levels of divergence. Alternatively or additionally, other colors, patterns or the like may be used to depict whether a divergence value is above or below a specified threshold. That is, red may be used for all divergence values above a specified threshold while blue may be used for all divergence values below the threshold. The X and Y axes represent the video frames in the video segment. Accordingly, a line of symmetry 505 (shown in blue in this illustration) represents each frame's divergence with itself (i.e., low to no divergence).

In order to identify cuts, black frames or other transitions in a video program, a ground truth or example frame or set of frames may be identified. This identification may be performed manually for example. Once the ground truth has been determined, a system may automatically identify other transitions or cuts based thereon. In one or more arrangements, the ground truth may be identified once prior to evaluating video segments and subsequently used to classify multiple program streams. That is, the ground truth might not be evaluated every time cuts, black frames or other transitions are to be identified. Instead, a previously generated ground truth may be applied.

In FIG. 5A, ground truth 503 corresponds to a frame 507*a* where a transition occurs in the video segment. As illustrated, the comparison of frame 507*a* with the other frames (such as frame 507*b*) in the video segment reveals a high level of divergence. This may indicate that frame 507*a* is substantially different in color, hue, saturation or the like from a significant portion of the video being analyzed. Since content items such as a television show may occupy more of the video segment than a commercial frame 507*a*, the fact that frame 507*a* has a high level of divergence with a majority of the frames in the video segment may be indicate that frame 507*a* is not part of the television show and is instead a commercial frame, a black frame, a transition frame or the like. Accordingly, a transition such as a cut or black frame may be identified between frames 507*a* and a previous or subsequent frame such as show frame 507*b*.

Various characteristics such as divergence, entropy and the like, that are indicative of a transition may be learned from a ground truth frame or video segment. Those characteristics may then be used to analyze a query frame to determine if the query frame includes such characteristics. If so, the query frame may be identified as a transition frame in the program or video segment.

Figure 5B:
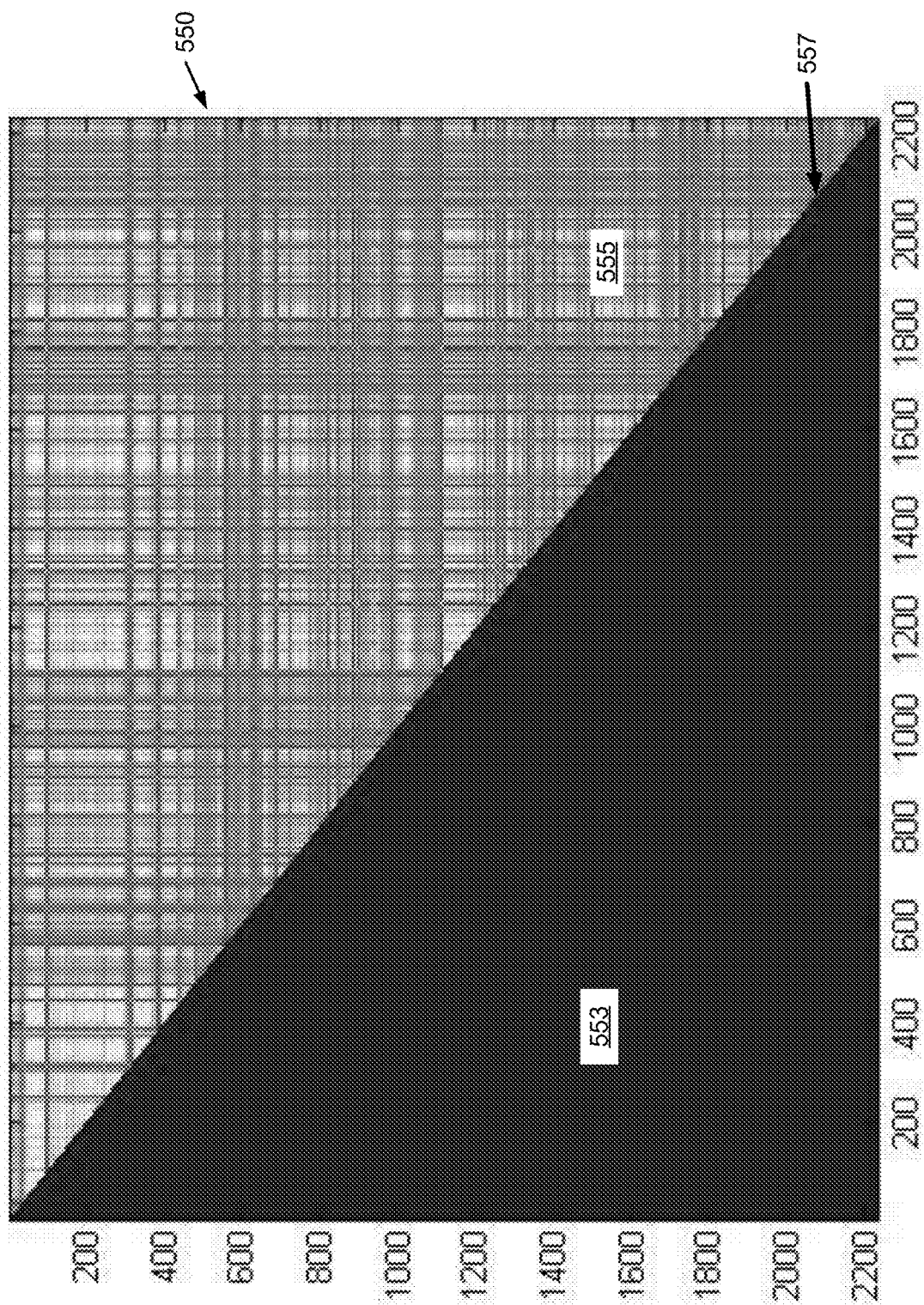
FIG. 5B illustrates a joint entropy matrix for a video segment according to one or more aspects described herein.

FIG. 5B illustrates a partial joint pairwise entropy matrix for a video segment using a 256 bin histogram on the color red. Portion 553 of matrix 550 is not shown for simplification as portion 553 would correspond to a mirror image of portion 555 about symmetry line 557. Similar to divergence matrix 501, the level of entropy between video frames may be represented by different colors or appearances. In the illustrated example, the darker color indicates a high level of entropy while the lighter color or appearance corresponds to a low level of entropy. A high level of entropy may indicate a transition in the video segment, for example, between one type of programming (e.g., sporting event) and another (e.g., a commercial).

Referring again to FIG. 3, in step 320, the video processing device may detect logos in the content stream to identify additional content boundaries not identified from the cut and fade detection algorithms. In particular, a transition from a television show to a commercial and vice versa may exist where certain logos appear or disappear. For example, television shows may include a visual station identifier in a predefined location throughout a majority of the program whereas commercials do not. When the video stream transitions from the television show to a commercial, the station logo may disappear. Logos may further include, for example, a sports scoreboard, an event logo (e.g., Olympic rings) and the like. Other forms of transitions or transition indicators may be used in addition or as an alternative to logos, cuts and fades. For example, a transition may comprise particular audio content. In one or more arrangements, the transition indicators used may include content that is rendered to be perceivable by the viewer or audience.

In step 325, the video processing device may divide (or segment) the content stream into segments along the boundaries detected in steps 315 and 320. Once the video portion has been segmented, the segments may be classified to separate television show segments from commercial segments. Accordingly, in step 330, the video processing device may select a segment classification algorithm based on an expected type of programming in the analyzed portion of video. The type of programming may be determined based on an electronic service guide (ESG). If the ESG indicates that the retrieved portion of content corresponds to a first type of television show (e.g., news), for example, a first type of classification algorithm may be used. If, however, the ESG information indicates that the retrieved portion of content corresponds to a second type of television show (e.g., a sporting event), a second type of classification algorithm may be selected. Different classification algorithms may use or place emphasis on different parameters or variables. For example, content duplicates might not be used or as strongly weighted when differentiating between sporting events and commercials since sporting events may include extended portions of video displaying a sporting environment such as a football field that may be identified as being duplicates or substantially similar. Instead, an image analysis technique for detecting logos may be given more weight in such scenarios since sporting events typically include a stable scoreboard element while commercials and/or news reports or other types of television shows generally do not. Thus, the existence or lack of a scoreboard element may be a relatively strong differentiator. Classification algorithms and techniques may also include support vector machines (SVMs), Kernel Density Estimation (KDE, a.k.a Parzen Windows), likelihood rations and/or heuristic classifiers.

In step 335, the device may categorize the segments into show segments and commercial segments using the selected classification algorithm. The selected algorithm for classifying television show segments and commercial segments may include analyzing one or more visual and/or audio characteristics of the segments. For example, the algorithm may include analyzing the determined entropy of the frames within each segment (step 340), audio and video duplicate analysis (step 345) and cut rate analysis (step 350). For example, higher entropy may be indicative of television shows while lower entropy may be indicative of commercials, as discussed above with respect to FIG. 4. Baseline entropy levels for commercials versus television shows may be established through empiric analysis. Video and audio duplicates within a segment may also be indicative of commercials as commercials tend to have repeating images and/or audio (e.g., repeating the products name or a slogan). Accordingly, if a portion of video or audio appears to repeat within a segment greater than a predefined number of times, the segment may be classified as a commercial. Additionally, commercials tend to be replayed frequently within a short period of time. Thus, if multiple segments include the same or substantially similar audio or video, the video processing device may classify the multiple segments as commercials and, in some instances, the same commercial.

The number of segments with duplicate audio or video may be compared to a threshold number of segments so that similar portions of video or audio within a television show are not mistakenly categorized as commercials. The use of a threshold follows the assumption that commercials will tend to repeat more often than scenes within a television show. Additionally or alternatively, the number and/or frequency of cuts may be indicative of a programming type. For example, commercials may include a higher frequency of cuts than television shows such as sports programming. Accordingly, the cut rate may be indicative of the type of content in the segment.

In step 355, the segments classified as the same or similar type (e.g., show segments) may be merged and stored together into a single video according to the sequence in which the segments were received. For example, the video may be stored in an on-demand database and made accessible to subscribers. Optionally, the commercial segments may be discarded or stored depending on user or service provider preferences and storage capacity.

FIG. 6 illustrates a method for audio duplicate detection. In step 600, an audio stream may be extracted from a multimedia content stream. Audio and video streams may be multiplexed together to form a transport stream for delivery to a receiving device. Thus, upon receipt, the audio and video streams may be extracted or demultiplexed for separate processing. In step 605, the audio stream is segmented into five second portions. The size of the portions may vary depending on the type of content being evaluated. For example, the audio stream may be segmented into 10 second portions, 2 second portions, 8 second portions, 30 second portions and the like. In step 610, the audio energy of each segmented portion of audio may be graphed. In one example, each second of audio may be represented by 4,000 data points. Accordingly, those data points may be graphed to form an audio energy graph over time (e.g., decibels vs. seconds or milliseconds). Depending on the audio compression techniques employed, one second of audio may comprise fewer or more data points (e.g., 2,000 data points, 10,000 data points, 60,000 data points).

In step 615, a first audio energy curve or graph of a first audio portion may be compared to the audio energies for each of the other segmented portions to measure similarity. The similarity measure may, for example, comprise a percentage of data points matching between two curves. The comparison may provide some flexibility in determining a match between two data points. For example, if two data points are within 5 dB of one another, the data points may be treated as a match. Flexibility may also be defined as a percentage of audio energy. In step 620, a system may identify audio portions having audio energy profiles matching the first audio energy profile based on the measure of similarity determined in step 615. The similarity measure, in one or more arrangements, may be expressed in terms of a percentage of data points matching. Accordingly, a match between audio portions may be identified if their corresponding audio energies match according to a threshold level of times (e.g., 75%, 90%, 95%, 100%).

In step 625, the system may determine whether the number of matches meets or exceeds a threshold level. If so, the segment corresponding to the audio portion may optionally be classified as a commercial in step 630. If not, the system may determine if there is an audio portion that has not yet been evaluated for matches in step 635. If an audio portion has not yet been analyzed, the process may select the next unanalyzed segment in step 640 and return to step 615. If the audio portions have been analyzed (635: No), the process ends.

In one or more arrangements, audio duplicate detection as a basis for classifying video may include identifying a sequence of adjacent or consecutive audio segments that repeat together. For example, for an audio stream divided into 5 second segments, a duplicate detection system may determine that 3 adjacent 5-second segments (e., 15 seconds of audio) are repeated in the same sequence in the audio stream. As one might imagine, a greater number of near-duplicates may exist for a smaller audio segment as compared to duplicates for larger or multiple consecutive audio segments. Thus, duplicate identification for smaller audio segments (e.g., a single audio segment) may result in a greater number of false positives. The identification of duplicates for multiple consecutive audio segments, however, may provide a stronger indication of a commercial, removing at least some of the false positives from consideration. In one or more arrangements, a sample size of 5-15 seconds may be used for analysis if it is assumed that a typical commercial is 30 seconds in length. Using a sample size of less than 5 seconds may result in excessive false positives while a sample size of greater than 15 seconds may reduce the chance of finding matches due to sampling noise.

Figure 7A:
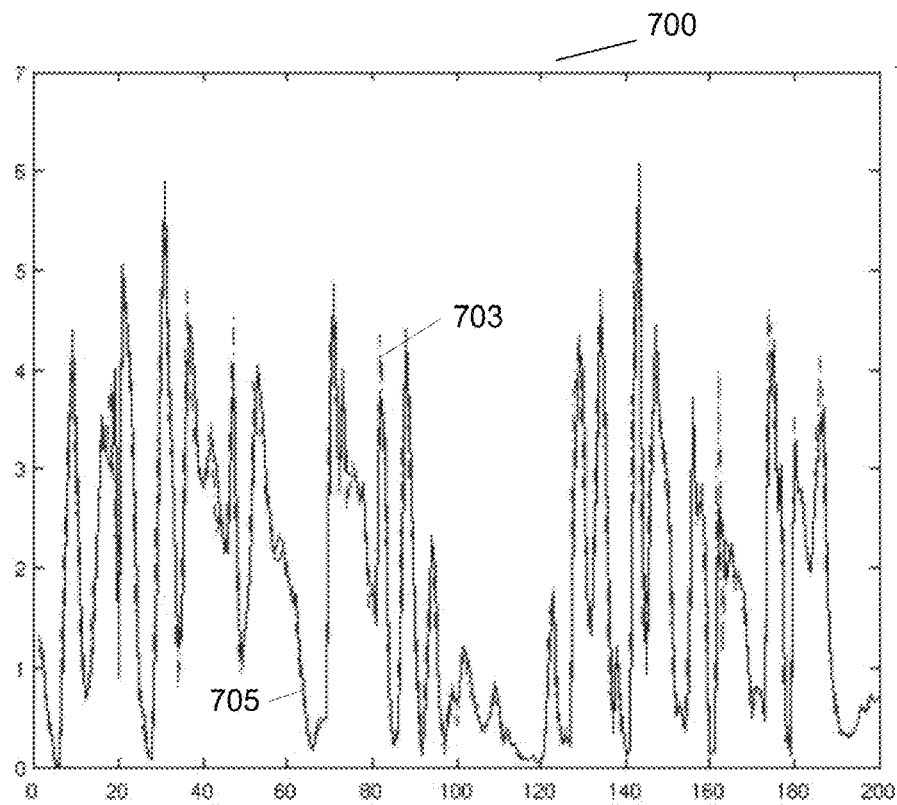
FIGS. 7A-7C are graphs illustrating matches between a query audio energy and audio energies of other segments in the content stream according to one or more aspects described herein.
Figure 7B:
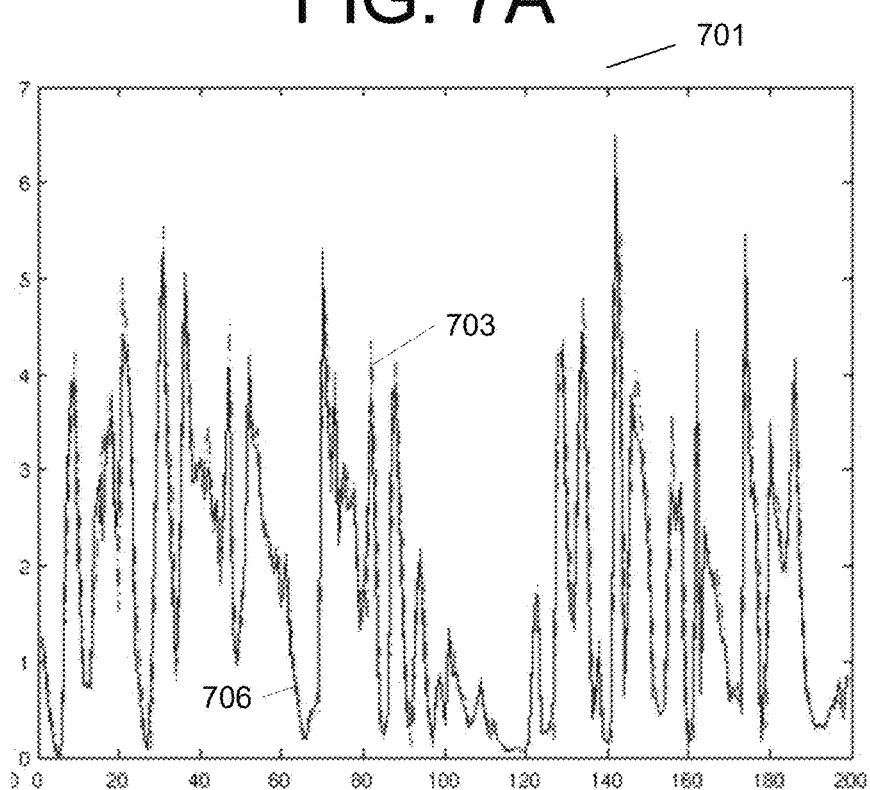
Figure 7C:
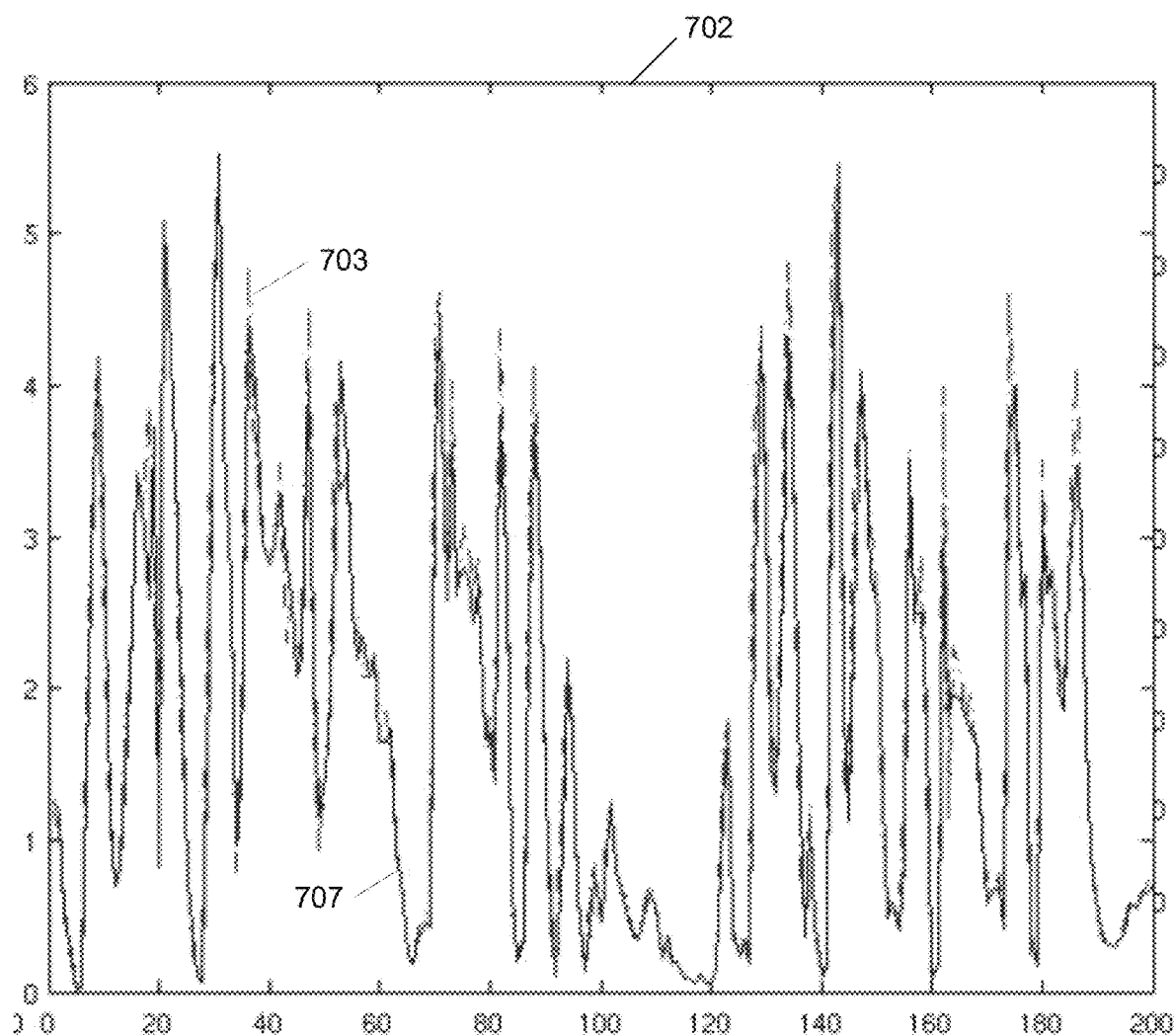

FIGS. 7A-7C illustrate three audio segments matching a query audio segment. In each of graphs 700, 701 and 702, solid curves 705, 706 and 707, respectively, represent the audio energy of the matching segment while the dashed line/curve 703 represents the query segment. As illustrated, the matching curves 705, 706 and 707 might not match exactly with the query curve 703 corresponding to the query audio segment. However, as described herein, some flexibility may be allowed for two audio energy curves to match. For example, so long as a threshold level of data points match, query segments 705, 706 and 707 are considered to match query curve 703. The threshold may include a specified number of data points or a percentage of data points that match.

Figure 8:
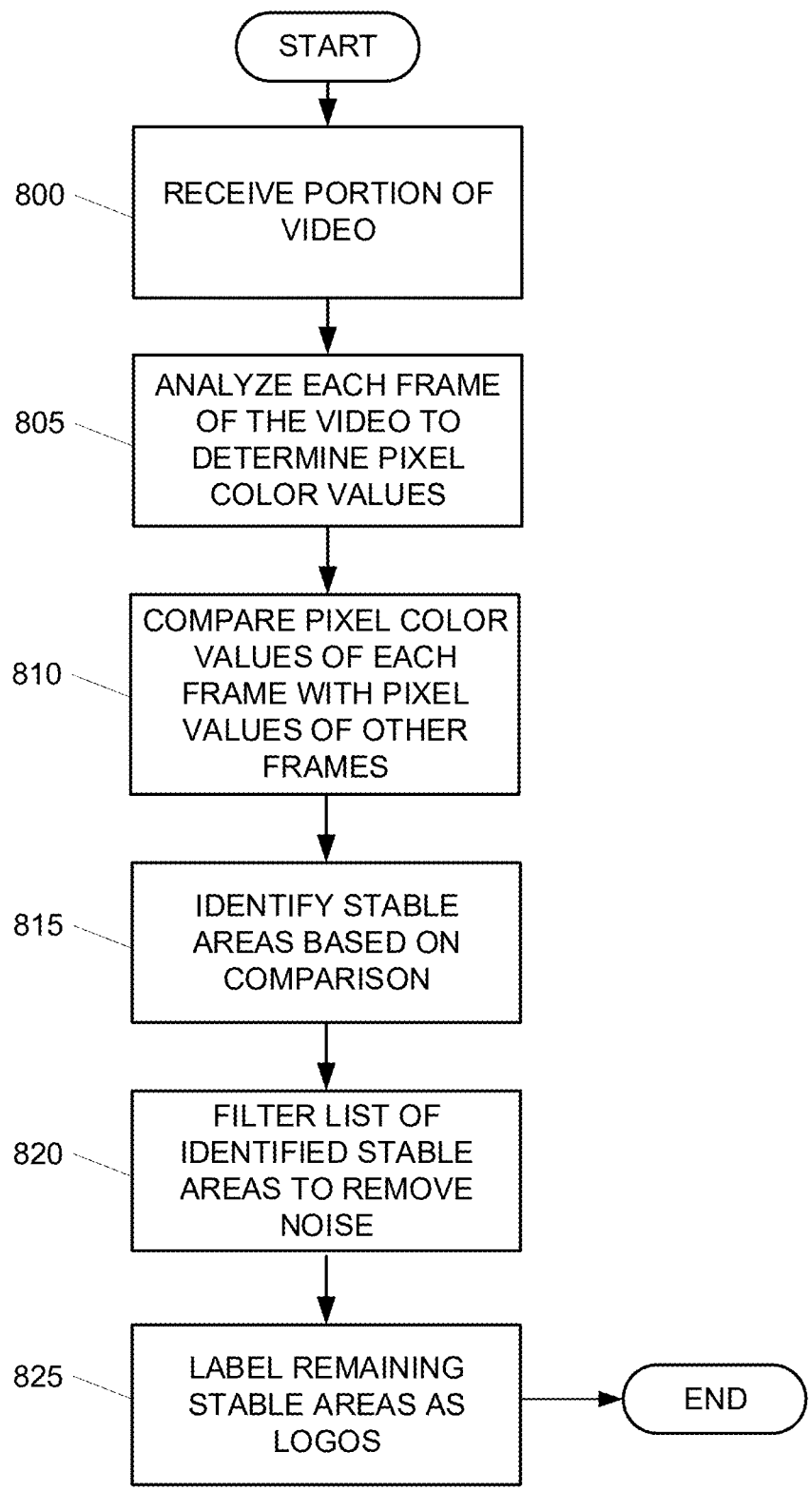
FIG. 8 is flowchart illustrating a method for detecting static logos within a content stream according to one or more aspects described herein.

FIG. 8 illustrates a method for detecting static logos such as broadcast station logos, scoreboards and signs within a video frame. In step 800, a portion of video may be received. In step 805, each frame of the video may be analyzed to determine a color value for the pixels in the frame. In step 810, the color values for each frame in the video may be compared with the colors values for other frames. Based on the comparison, a video processing system may identify stable areas in the video in step 815. For example, stable areas may be identified in areas of a video where pixels have low color variance (i.e., little to no change in color value over time). The identification of stable areas may include the comparison of the color value for a pixel having coordinates (x, y) in a first frame with the color value for a pixel having the same coordinates (x, y) in a second frame. Because static logos generally do not change location, the logo detection algorithm can recognize static (i.e., location and appearance constant) logos.

In step 820, the identified stable areas may be filtered to remove noise. For example, if a static area occupies over half of the video frame, the static area may be removed as noise since logos tend not to occupy more than half of a video display (e.g., a thick border surrounding the screen). Similarly, if the static area is smaller than a threshold size (e.g., includes less than a threshold number of pixels), the static area may also be discarded as a false-positive. Other types of noise may include pixels that lack cohesiveness and stable areas that last too long or too short an amount of time or that appear intermittently. Upon removal of the noise, the remaining stable areas may be labeled as logos in step 825.

Figure 9:
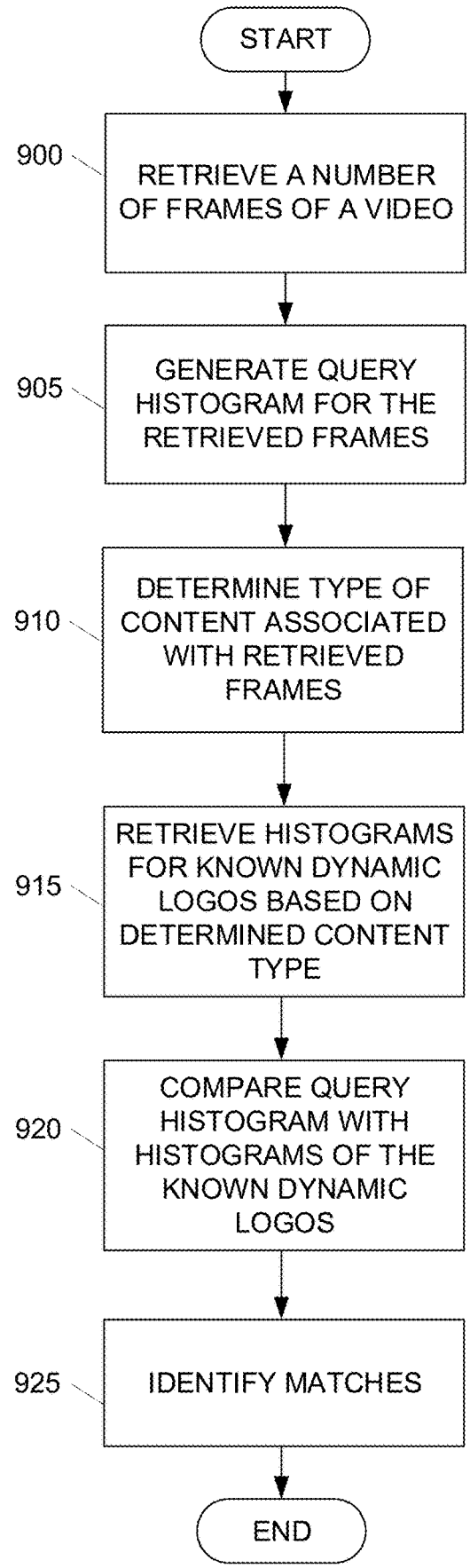
FIG. 9 is a flowchart illustrating a method for detecting dynamic logos within a content stream according to one or more aspects described herein.

In some instances, logos may be dynamic or animated. For example, production companies or transmission companies may include an animated sequence at the end of programming for identification purposes. Detecting dynamic or animated logos provides another mechanism for determining the beginning and end of programs. FIG. 9 illustrates a method for dynamic logo detection. In step 900, for example, a video analysis system may retrieve frames of a video for a specified amount of time. In one example, a two second portion may be extracted from the video. If the video is recorded at 30 frames per second, the two second portion would correspond to 60 frames of retrieved video. In step 905, a single query histogram charting the values for a frame attribute may be generated for the 60 frames. The number of bins in the histogram may be predefined or may be determined based on the values for the attribute existing in those frames. In one example, the number and ranges for the bins may be predefined so that multiple histograms may be readily compared.

In step 910, the system may determine a type of content associated with the retrieved frames. The system may then retrieve histograms for known dynamic logos from a database in step 915 based on the determined type of content. For example, if the retrieved frames of video correspond to a sporting event, the system may retrieve known dynamic logo histograms corresponding to replays or game beginning/ending animations. In one or more arrangements, the system might always retrieve dynamic logo histograms for the channels on which the content is being transmitted. In another example, if the frames of the video correspond to a movie, the system may retrieve known dynamic logo histograms for movie studio logos. In step 920, the system may compare the query histograms with each of the predefined or known dynamic logo histograms and subsequently identify matches based thereon in step 925. For example, the number of occurrences for each histogram bin may be compared to determine if the bins match. Whether two histograms match may thus depend on the number of matching bins. The identification of a match may be flexible so that two bins may be considered as matching so long as the difference in the number of occurrences is within a predefined threshold percentage or number of one another. Similarly, a histogram may match another histogram if the histograms match a threshold number or percentage of bins (e.g., all, at least 75%, at least 90%).

By identifying more precise start and end times for programming, a subscriber's home recording device may automatically adjust start and end times as necessary. This prevents the recording device from relying solely on predefined show times that may be inaccurate due to unforeseen or unpublished changes in the schedule. FIG. 10 illustrates a method for automatic extension of recording times. In step 1000, a system may receive a request to record a program. For example, a user may operate a user input device to identify a desired program and to select a record option in association therewith. In step 1005, the system may determine start and end times for the program based on predefined electronic service guide information. In step 1010, the system may begin recording the desired program at the determined start time. For example, the program may be recorded to a local hard disk drive of the system. In step 1015, the system may determine if a predefined time in the program has been reached. For example, the predefined time may correspond to 10 minutes before a scheduled end time. Alternatively or additionally, the system may continuously or periodically analyze portions of the recorded content throughout the entire scheduled time. If the predefined time has not been reached, the system may continue to monitor the time, returning to step 1015. If the predefined time in the program has been reached, the system may analyze a portion of recorded content for an end of program indicator in step 1020. The analyzed portion may correspond to the last recorded portion of programming. An end of program indicator may include a dynamic logo, credit roll, lengthy black frames, signature jingles and the like.

In step 1025, the system may determine whether an end of program indicator has been detected. If so, the system may end recording of the program in step 1030. If, however, the system has not detected an end of program indicator, the system may automatically extend the recording time in step 1035 for a specified amount of time or indefinitely until an end of program indicator is detected and return to step 1015. In one example, the system may automatically extend the recording time (and, consequently, the recording end time) for 5 minutes at a time until the end of program indicator is found. Accordingly, using automatic extension features, a subscriber does not need to be aware of circumstances in which a program might run longer than expected, have a delayed begin time (resulting in a later end time) and the like.

The methods and features recited herein may further be implemented through any number of computer readable media (e.g., memory) that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of the IC. Further, the IC may output image data to a display buffer.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

The invention claimed is:

1. A method comprising:
   receiving, by a computing device, a content item, from a media stream, that comprises primary content and supplemental content;
   selecting, from a plurality of classification algorithms and based on a content type of the primary content, a classification algorithm corresponding to the content type, wherein the classification algorithm is configured to analyze one or more visual elements corresponding to the content type;
   determining, based on the selected classification algorithm, the supplemental content in the content item; and
   generating, based on the determined supplemental content, an updated version of the content item that omits at least a portion of the determined supplemental content.

2. The method of claim 1, further comprising:
   determining, based on a quantity of repeating visual elements corresponding to the content type, the content type of the primary content.

3. The method of claim 1, wherein the primary content comprises at least one of:
   a news program;
   a sporting event;
   a movie; or
   a public service announcement.

4. The method of claim 1, further comprising:
   determining, from the media stream, a plurality of second content items; and
   selecting, from the plurality of classification algorithms based on different repeating visual elements of the plurality of second content items, a corresponding classification algorithm for each of the plurality of second content items.

5. The method of claim 1, wherein the determining the supplemental content is further based on a determination that a quantity of repeating elements occurs within a time period.

6. The method of claim 1, wherein the determining the supplemental content is further based on detecting a juncture in the media stream where a logo occurs or stops occurring.

7. The method of claim 1, wherein the determining the supplemental content is further based on detecting particular audio content indicating a content boundary of the supplemental content.

8. An apparatus comprising:
   one or more processors; and
   memory storing instructions that, when executed by the one or more processors, configure the apparatus to:
      receive a content item, from a media stream, that comprises primary content and supplemental content;
      select, from a plurality of classification algorithms and based on a content type of the primary content, a classification algorithm corresponding to the content type, wherein the classification algorithm is configured to analyze one or more visual elements corresponding to the content type;
      determine, based on the selected classification algorithm, the supplemental content in the content item; and
      generate, based on the determined supplemental content, an updated version of the content item that omits at least a portion of the determined supplemental content.

9. The apparatus of claim 8, wherein the instructions, when executed by the one or more processors, further configure the apparatus to determine, based on a quantity of repeating visual elements corresponding to the content type, the content type of the primary content.

10. The apparatus of claim 8, wherein the primary content comprises at least one of:
    a news program;
    a sporting event;
    a movie; or
    a public service announcement.

11. The apparatus of claim 8, wherein the instructions, when executed by the one or more processors, further configure the apparatus to:
    determine, from the media stream, a plurality of second content items; and
    select, from the plurality of classification algorithms based on different repeating visual elements of the plurality of second content items, a corresponding classification algorithm for each of the plurality of second content items.

12. The apparatus of claim 8, wherein the instructions, when executed by the one or more processors, configure the apparatus to determine the supplemental content by determining the supplemental content further based on a determination that a quantity of repeating elements occurs within a time period.

13. The apparatus of claim 8, wherein the instructions, when executed by the one or more processors, configure the apparatus to determine the supplemental content by determining the supplemental content further based on detecting a juncture in the media stream where a logo occurs or stops occurring.

14. The apparatus of claim 8, wherein the instructions, when executed by the one or more processors, configure the apparatus to determine the supplemental content by determining the supplemental content further based on detecting particular audio content indicating a content boundary of the supplemental content.

15. One or more nontransitory computer-readable media storing instructions that, when executed, cause:
    receiving a content item, from a media stream, that comprises primary content and supplemental content;
    selecting, from a plurality of classification algorithms and based on a content type of the primary content, a classification algorithm corresponding to the content type, wherein the classification algorithm is configured to analyze one or more visual elements corresponding to the content type;

determining, based on the selected classification algorithm, the supplemental content in the content item; and generating, based on the determined supplemental content, an updated version of the content item that omits at least a portion of the determined supplemental content.

16. The one or more nontransitory computer-readable media of claim 15, wherein the instructions, when executed, further cause determining, based on a quantity of repeating visual elements corresponding to the content type, the content type of the primary content.

17. The one or more nontransitory computer-readable media of claim 15, wherein the primary content comprises at least one of:

a news program;

a sporting event;

a movie; or a public service announcement.

18. The one or more nontransitory computer-readable media of claim 15, wherein the instructions, when executed, further cause:

determining, from the media stream, a plurality of second content items; and selecting, from the plurality of classification algorithms based on different repeating visual elements of the plurality of second content items, a corresponding classification algorithm for each of the plurality of second content items.

19. The one or more nontransitory computer-readable media of claim 15, wherein the instructions, when executed, cause determining the supplemental content by determining the supplemental content further based on a determination that a quantity of repeating elements occurs within a time period.

20. The one or more nontransitory computer-readable media of claim 15, wherein the instructions, when executed, cause determining the supplemental content by determining the supplemental content further based on detecting a juncture in the media stream where a logo occurs or stops occurring.

21. The method of claim 1, wherein each of the plurality of classification algorithms:

corresponds to a respective content type of a plurality of content types; and is configured to analyze one or more respective visual elements associated with the respective content type.

22. The method of claim 1, wherein the supplemental content comprises an advertisement.

23. The apparatus of claim 8, wherein the supplemental content comprises an advertisement.

24. The one or more nontransitory computer-readable media of claim 15, wherein the supplemental content comprises an advertisement.

* * * * *